United States Patent [19]

Nonoshita et al.

[11] Patent Number: 5,295,000
[45] Date of Patent: Mar. 15, 1994

[54] IMAGE PROCESSING APPARATUS WITH FLEXIBLE USE OF MEMORY AND VARIABLE NUMBER OF BITS PER PIXEL

[75] Inventors: Hiroshi Nonoshita, Fujisawa; Yasuhisa Ishizawa, Yokohama; Yoshitsugu Yamanashi, Kawasaki; Kenjiro Cho, Tokyo, all of Japan

[73] Assignee: Canon Kabushiki Kaisha, Tokyo, Japan

[21] Appl. No.: 93,038

[22] Filed: Jul. 19, 1993

Related U.S. Application Data

[63] Continuation of Ser. No. 560,752, Jul. 31, 1990, abandoned.

[30] Foreign Application Priority Data

Aug. 2, 1989 [JP] Japan .................... 1-199348
Jan. 10, 1990 [JP] Japan .................... 2-1490

[51] Int. Cl.$^5$ .................................. H04N 1/40
[52] U.S. Cl. .................... 358/444; 358/448; 358/450; 358/451; 358/453; 358/462; 382/61; 345/119
[58] Field of Search ........... 358/462, 450, 453, 444, 358/448, 80, 433, 451, 261.3, 903, 483; 382/61; 340/728, 703; 364/521, 518

[56] References Cited

U.S. PATENT DOCUMENTS

| | | | |
|---|---|---|---|
| 4,450,044 | 6/1988 | Nakajima | 358/280 |
| 4,641,197 | 2/1987 | Miyagi | 358/462 |
| 4,811,416 | 3/1989 | Nakamura | 358/443 |
| 4,843,632 | 6/1989 | Lee et al. | 382/56 |
| 4,922,349 | 5/1990 | Abe et al. | 358/75 |
| 4,942,479 | 7/1990 | Kanno | 358/453 |
| 4,975,861 | 12/1990 | Fujimoto | 364/521 |
| 5,034,806 | 7/1991 | Ikeda et al. | 358/80 |
| 5,043,713 | 8/1991 | Katsura et al. | 364/521 |

FOREIGN PATENT DOCUMENTS

| | | |
|---|---|---|
| 95931 | 12/1983 | European Pat. Off. |
| 269746 | 6/1988 | European Pat. Off. |
| 0246153 | 12/1985 | Japan ............... 358/444 |

Primary Examiner—John K. Peng
Assistant Examiner—Niner Tong
Attorney, Agent, or Firm—Fitzpatrick, Cella, Harper & Scinto

[57] ABSTRACT

An image processing apparatus is disclosed which inputs/outputs an image in which image data items having different quantities of information for each pixel are mixed with one another. The information quantity for each of the image data items and information about the I/O positions are stored in a corresponding manner. When data is input, data is converted into the proper information quantities in accordance with input position, for storage. When data is output, the stored image data is converted into output data in accordance with the respective information quantities. As a result, the memory capacity can be reduced, the flexibility can be improved at the time of use and the memory can be used efficiently.

17 Claims, 17 Drawing Sheets

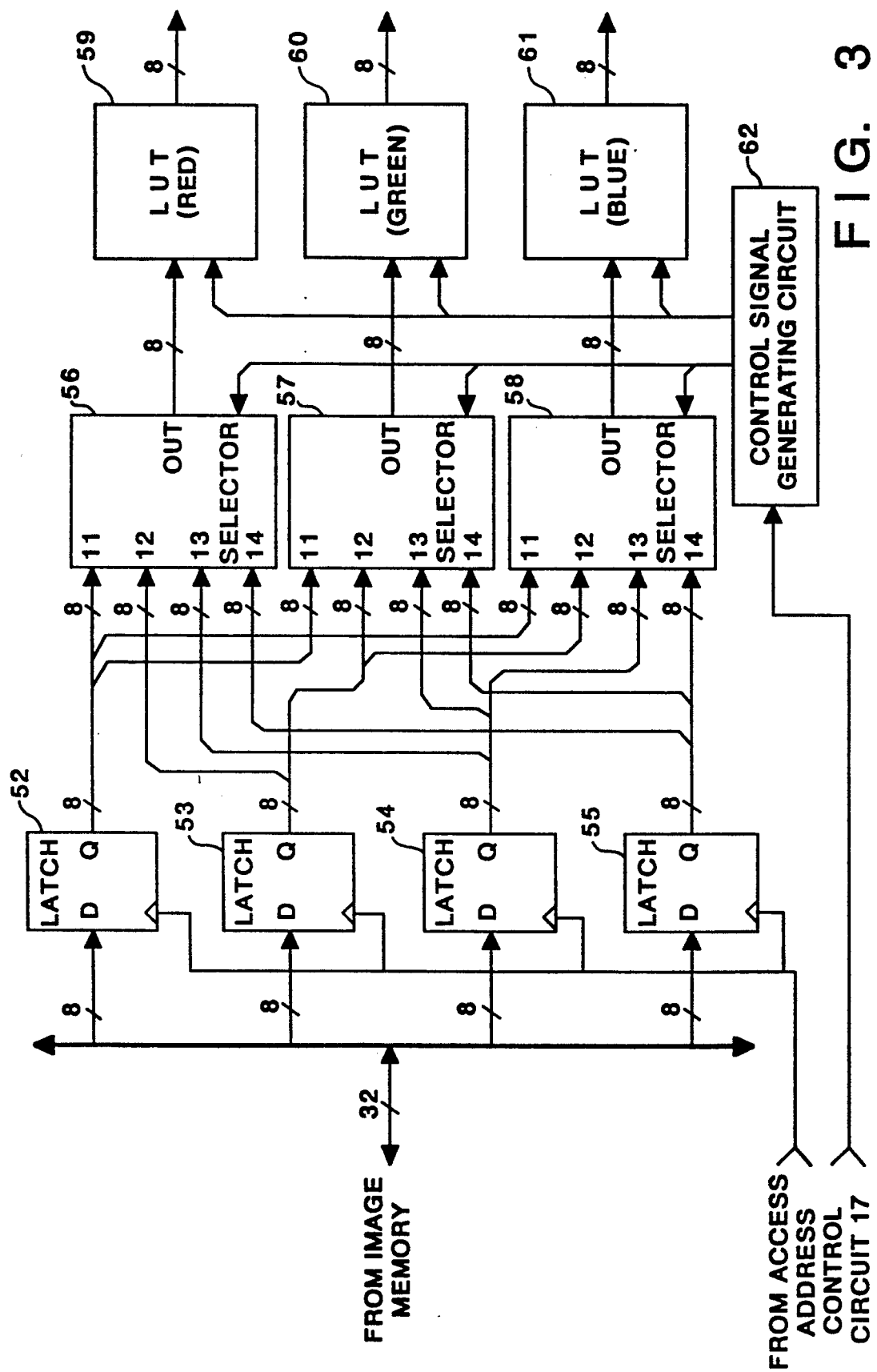
F I G. 3

| TYPE | TYPE OF DATA |
|---|---|
| 0 | 1 BIT / PIXEL |
| 1 | 2 BITS / PIXEL |
| 2 | 4 BITS / PIXEL |
| 3 | 8 BITS / PIXEL |
| 4 | 12 BITS / PIXEL 4 BITS FOR EACH OF RGB |
| 5 | 16 BITS / PIXEL |
| 6 | 24 BITS / PIXEL 8 BITS FOR EACH OF RGB |
| 7 | 32 BITS / PIXEL 8 BITS FOR EACH OF RGBBK |

FIG. 5C

| OUTPUT POSITION | | READ ADDRESS | TYPE OF DATA |
|---|---|---|---|
| MAIN SCANNING DIRECTION | SUB-SCANNING DIRECTION | | |
| 0 | 0 | - | 0 |
| X0 | Y0 | # a0 | TYPE = 2 |
| X0 + W0 | | - | 0 |
| X0 | Y0 + 1 | # (a0 + W0 / 2) | TYPE = 2 |
| ⋮ | ⋮ | ⋮ | ⋮ |
| X0 + W0 | Y0 + H0 - 1 | - | 0 |
| X1 | Y1 | # b0 | TYPE = 0 |
| X1 + W1 | | - | 0 |
| X1 | Y1 + 1 | # (b0 + W1 / 8) | TYPE = 0 |
| ⋮ | ⋮ | ⋮ | ⋮ |
| X1 + W1 | Y1 + H1 - 1 | - | 0 |
| X2 | Y2 | # b1 | TYPE = 0 |
| X2 + W2 | | - | 0 |
| X2 | Y2 + 1 | # (b1 + W2 / 8) | TYPE = 0 |
| ⋮ | ⋮ | ⋮ | ⋮ |
| X5 | Y5 | # c0 | TYPE = 6 |
| X5 + W5 | | - | 0 |
| X2 | Y5 + 1 | # (b1+ (Y5 - Y2)*W2/8) | TYPE = 0 |
| X2 + W2 | | - | 0 |
| X5 | | # (c0 + W5 * 3) | TYPE = 6 |
| X5 + W5 | | - | 0 |
| ⋮ | ⋮ | ⋮ | ⋮ |
| X3 | Y3 | # b2 | TYPE = 0 |
| ⋮ | ⋮ | ⋮ | ⋮ |
| X4 | Y4 | # b3 | TYPE = 0 |
| ⋮ | ⋮ | ⋮ | ⋮ |
| X6 | Y6 | # d0 | TYPE = 3 |
| X6 + W6 | | - | 0 |
| X4 | | # (b3+ (Y6 - Y4)*W4/8) | TYPE = 0 |
| X4 + W4 | | - | 0 |
| X6 | Y6 + 1 | # (d0 + W6) | TYPE = 3 |
| ⋮ | ⋮ | ⋮ | ⋮ |
| X4 | Y4 + H4 - 1 | # (b3+ H4*W4 / 8) | TYPE = 0 |
| X4 + W4 | | - | 0 |
| X6 | Y4 + H4 | # (d0+(Y4+H4-Y6) * W6) | TYPE = 3 |
| X6 + W6 | | - | 0 |
| ⋮ | ⋮ | ⋮ | ⋮ |
| X6 + W6 | Y6 + H6 - 1 | - | 0 |

FIG. 5D

IMAGE PROCESSING APPARATUS WITH FLEXIBLE USE OF MEMORY AND VARIABLE NUMBER OF BITS PER PIXEL

This application is a continuation of application Ser. No. 07/560,752 filed Jul. 31, 1990, now abandoned.

BACKGROUND OF THE INVENTION

Field of the Invention

The present invention relates to an image processing apparatus, and, more particularly, to an image processing apparatus such as a work station for displaying, editing and outputting image wherein each pixel is represented by more than one bit data in which multivalued image, binary image wherein each pixel is one bit and the like are mixed with one another.

Description of the Related Arts

Hitherto, an apparatus of the type described above has been arranged in such a manner that the number of types of data which can be simultaneously processed is limited to one. When the memory capacity is small, the quantity of information for expressing one pixel is reduced to 1 bit/pixel or 8 bits/pixel or the output resolution is deteriorated. In the case where the memory capacity is large, the quantity of information for expressing one pixel is arranged to be 24 bits/pixel in which 8 bits are provided for each of the color components R, G and B. As a result, the memory for one pixel has been secure.

When data items of a plurality of types are simultaneously processed, a structure must be constituted in such a manner that a plurality of exclusive memories are provided for regions for binary images, regions for multivalued images and regions for color images and the plurality of the exclusive memories are then synthesized.

However, the above-described conventional structure raises the following problems:

Since the memory capacity is insufficient, the quality of the output image may be deteriorated if the quantity of information for expressing one pixel is reduced to, for example, 1 bit/pixel or 8 bits/pixel or the resolution of the output is lowered. Furthermore, a color palette, a lookup table or a resolution-conversion circuit must be provided.

On the contrary, when the quantity of information for expressing one pixel is arranged to be 24 bits/pixel consisting of 8 bits each for R, G and B so as to prepare a memory for one frame, an excessively large capacity memory must be provided, causing the cost of the apparatus to be raised excessively. Furthermore, when multivalued white and black data or binary data the information quantity of which is small is written, a long processing time is necessary similarly to the case where data having a large information quantity is written.

Furthermore, when a plurality of exclusive memories are prepared for the regions for the binary images and the regions for the color images and the plurality of the exclusive memories are synthesized, the memory capacity for each of the data items is undesirably fixed and the number of the types of the data items which can be processed is limited to two or three. As a result, the image data cannot be flexibly processed.

SUMMARY OF THE INVENTION

Accordingly, an object of the present invention is to provide an image processing apparatus the necessary memory capacity of which can be reduced, the flexibility of which can be improved at the time of use and the memory of which can be used efficiently.

In order to achieve the above-described object, an aspect of the present invention lies in an image processing apparatus for transmitting an image in which image data have different information quantity for one pixel, comprising: first storage means for storing the different image data in a mixed manner; second storage means for storing the information quantity of each portion of the image data and information about the output position in a corresponding manner; means for determining the outputting order of the image data in accordance with information about the output position of the image data; reading means for reading image data from the image data stored in the mixed manner in accordance with the order determined by the determining means; and output means for converting the image data read by the reading means into data which corresponds to the output in accordance with information about the information quantity of the image data.

The above-described output means includes a lookup table for converting the image data read by the reading means into data which corresponds to the output in accordance with information about the type of the image data.

According to the thus arranged structure, a variety of image data items can be stored in the same memory with each of the information quantities maintained. Therefore, data having a large quantity of information can be stored with the information quantity maintained. Furthermore, data having a small information quantity can be stored without taking an excessively long time so that the data stored can be transmitted in a data format is adapted to the output apparatus. Therefore, the necessary memory capacity can be reduced, satisfactory flexibility can be realized and the memory can be efficiently used.

Another aspect of the present invention lies in an image processing apparatus comprising: first storage means for storing image data; output means for transmitting the image data; second storage means for storing information about the data format of the image data stored in the first storage means in a manner corresponding to information about the output position to the output means; and conversion means for converting the image data read from the storage position in the first storage means which corresponds to information about the output position stored in the second storage means into a format of image data to be transmitted to the output means in accordance with information about the output position to the output means.

As a result, the first storage means stores image data items of various numbers of bits/pixel in a compact manner so that an excellent quality image is reproduced at high speed at the time of the printing or the displaying.

Another aspect of the present invention lies in an image processing apparatus comprising input means for inputting the image data and conversion means for converting the image data input from the input means into data to be written in the first storage means in accordance with the information in the second storage means.

As a result, image data can be stored in the first storage means in a compact manner in accordance with the characteristics of each of the images on the original image with the quality of the original image maintained.

Other and further objects, features and advantages of the invention will be more fully apparent from the following detailed description of the preferred embodiments, taken in conjunction with the accompanying drawings.

BRIEF DESCRIPTION OF THE DRAWINGS

FIG. 3 specifically illustrates the output data conversion portion shown in FIG. 1;

FIGS. 5A to 5D illustrate data for each of the portions for obtaining the output shown in FIG. 4A;

DETAILED DESCRIPTION OF THE PREFERRED EMBODIMENT

Preferred embodiments of the present invention will now be described with reference to the drawings.

Figure 13:
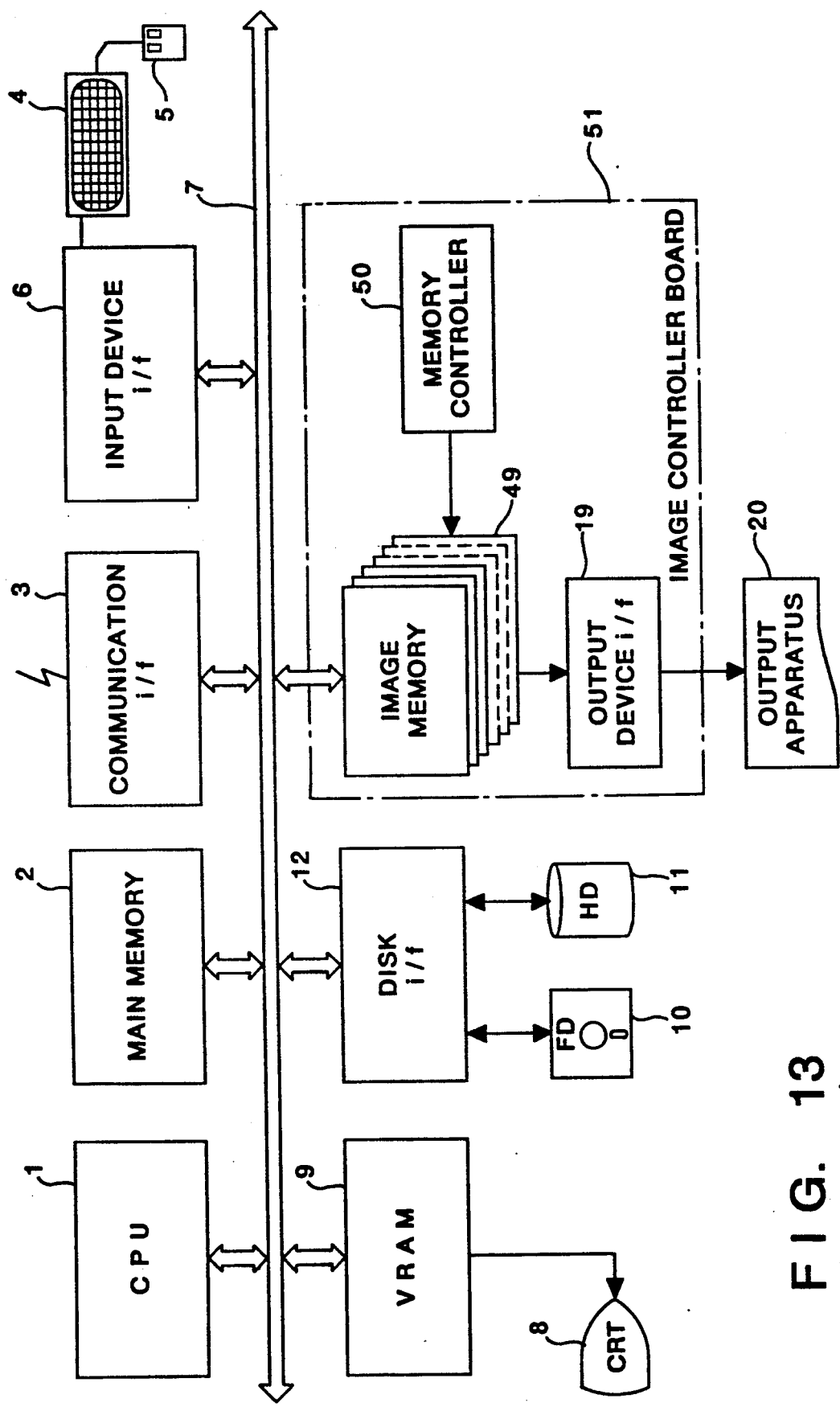
FIGS. 13 and 14 are block diagrams which illustrate a conventional image processing apparatus.

First, an example of a conventional image processing apparatus will be described with reference to FIG. 13. Referring to FIG. 13, reference numeral 1 represents a CPU for controlling the overall body of the apparatus. Reference numeral 2 represents a main memory for temporarily storing a program or serving as a working region and 3 represents a communication interface (to be abbreviated to "i/f" hereinafter) for establishing a communication with a LAN. Reference numeral 4 represents a keyboard through which a character code or the like is input and 5 represents a mouse for instructing the position on the display. Reference numeral 6 represents an input device interface (to be abbreviated to "input device i/f" hereinafter) for controlling an input device such as the keyboard 4, the mouse 5 or the like. Reference numeral 7 represents a system bus through which address data, a control signal and the like passes and 8 represents a CRT display serving as a display device. Reference numeral 9 represents a video RAM (to be abbreviated to "VRAM" hereinafter), 10 represents a floppy disk drive (to be abbreviated to "FD" hereinafter) and 11 represents a hard disk drive (to be abbreviated to "HD" hereinafter). Reference numeral 12 represents a disk interface (to be abbreviated to "DISK i/f") for establishing a communication with the FD 10 and that with the HD 11. Reference numeral 19 represents an output interface (to be abbreviated to "output device i/f") for establishing a connection with an output apparatus such as a printer. Reference numeral 20 represents the output apparatus such as a printer. Reference numeral 49 represents an image memory for storing image data, 50 represents a memory controller for controlling the image memory 49 and 51 represents an image controller board.

Hitherto, as an output to a white and black multivalued printer, binary data "0" is simply converted into 00H and "1" is also simply converted into FFH or the image memories 49 are held by the number which corresponds to the number of the multivalued planes so as to be stored as multivalued data. As an output to a color printer, 7-color expression of R, G, B, Y, M, C and Bk is realized with the memory for four planes held or the memory of the number of the planes for all of the frames held. That is, the number of bits for one pixel of data developed in the image memory 49 is the same for any place in a frame.

Therefore, in the case where there is provided only a memory for binary data, the gradation expression of an image cannot be performed. As a result, the obtainable image quality has been insufficient. On the other hand, in the case where there are provided the memories equal in number to the planes, data corresponding to the binary data must be processed as multivalued data. Therefore, an excessively long time is needed to reload the memory or the like since one bit of data is expressed by a plurality of bits. That is, in the case where there is provided only a memory for one plane, the cost can be reduced. However, the image quality is insufficient. On the contrary, in the case where there are provided memories for a plurality of planes, an excellent image quality can be obtained. However, the cost cannot be reduced.

First Structural Example

Figure 1:
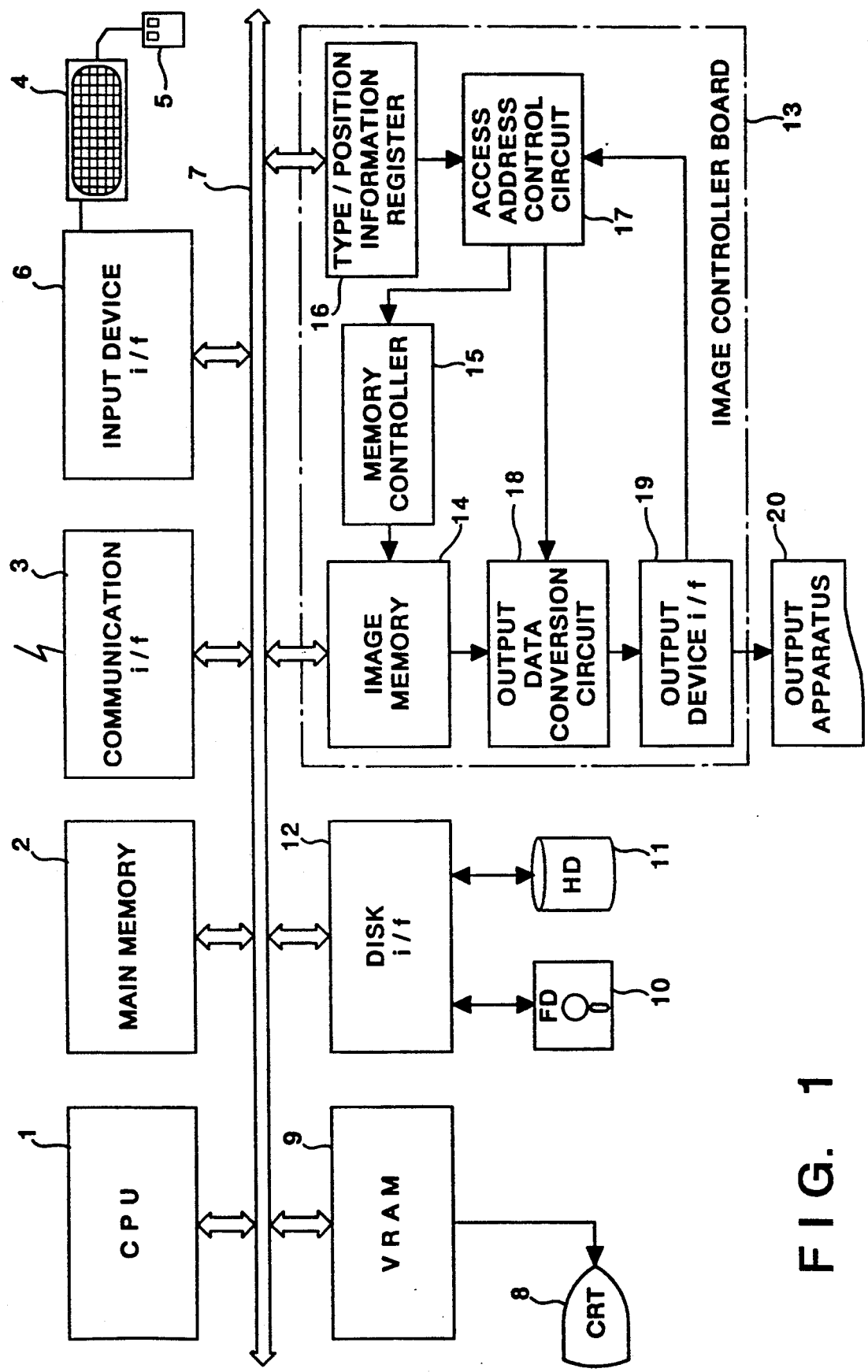
FIG. 1 is a block diagram which illustrates the structure of a first embodiment of an image processing apparatus according to the present invention.
Figure 2:
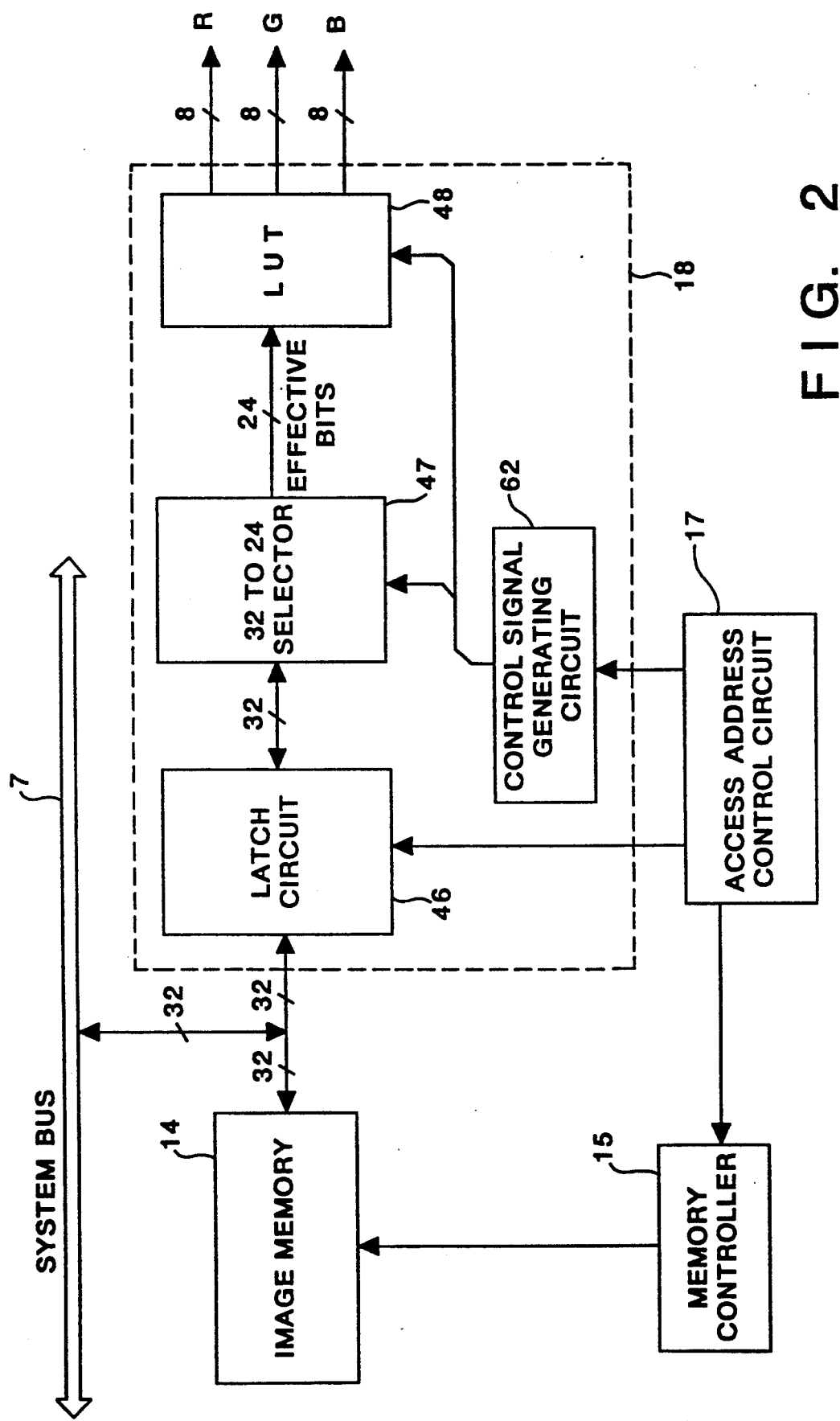
FIG. 2 is a block diagram which illustrates the structure of an output data conversion portion shown in FIG. 1.

As shown in FIG. 1, according to this embodiment, a circuit (for example, an access address control circuit 17) for controlling data is provided in the vicinity of the memory. Furthermore, a selector 47 and a lookup table 48 (to be abbreviated to "LUT" hereinafter) as shown in FIG. 2 are provided. As a result, data of different type can be processed in an output frame depending upon the place.

Referring to FIG. 1, the same elements as those shown in FIG. 13 are given the same reference numerals. This embodiment is characterized by an image controller board 1 comprising an extensible image memory 14 for storing image data, a memory controller 15, a type/position information register 16 for determining the type and the output position of the image data, an access address control circuit 17 for determining the type of data to be output, an output data conversion circuit 18 for converting data supplied from the image memory 14 into a data format which corresponds to the output apparatus depending upon the type of the data and the output apparatus i/f 19 which is the interface for establishing a connection with the output apparatus.

FIG. 2 is a block diagram which illustrates the structure of the output data conversion circuit 18 shown in FIG. 1. Referring to the drawing, reference numeral 46 represents a latch circuit for temporarily storing data supplied from the image memory 14. Reference numeral 47 represents a selector for selecting necessary bits from the supplied 32 bits depending upon the type of the data. Reference numeral 48 represents an LUT serving as a color palette for converting data supplied from the selector 47 into data adapted to the output apparatus i/f 19. Reference numeral 62 represents a control signal generating circuit.

FIG. 3 further schematically illustrates the block 18 shown in FIG. 2, where reference numerals 52 to 55 represent latch circuits for latching 32 bits of data supplied from the image memory 14. Reference numerals 56 to 58 represent selectors each for selecting 8 bits from the 32 bits data and 59 represents an LUT for outputting data corresponding to red. Reference numeral 60 represents an LUT for outputting data corresponding to green and 61 represents an LUT for outputting data corresponding to blue.

Figure 4A:
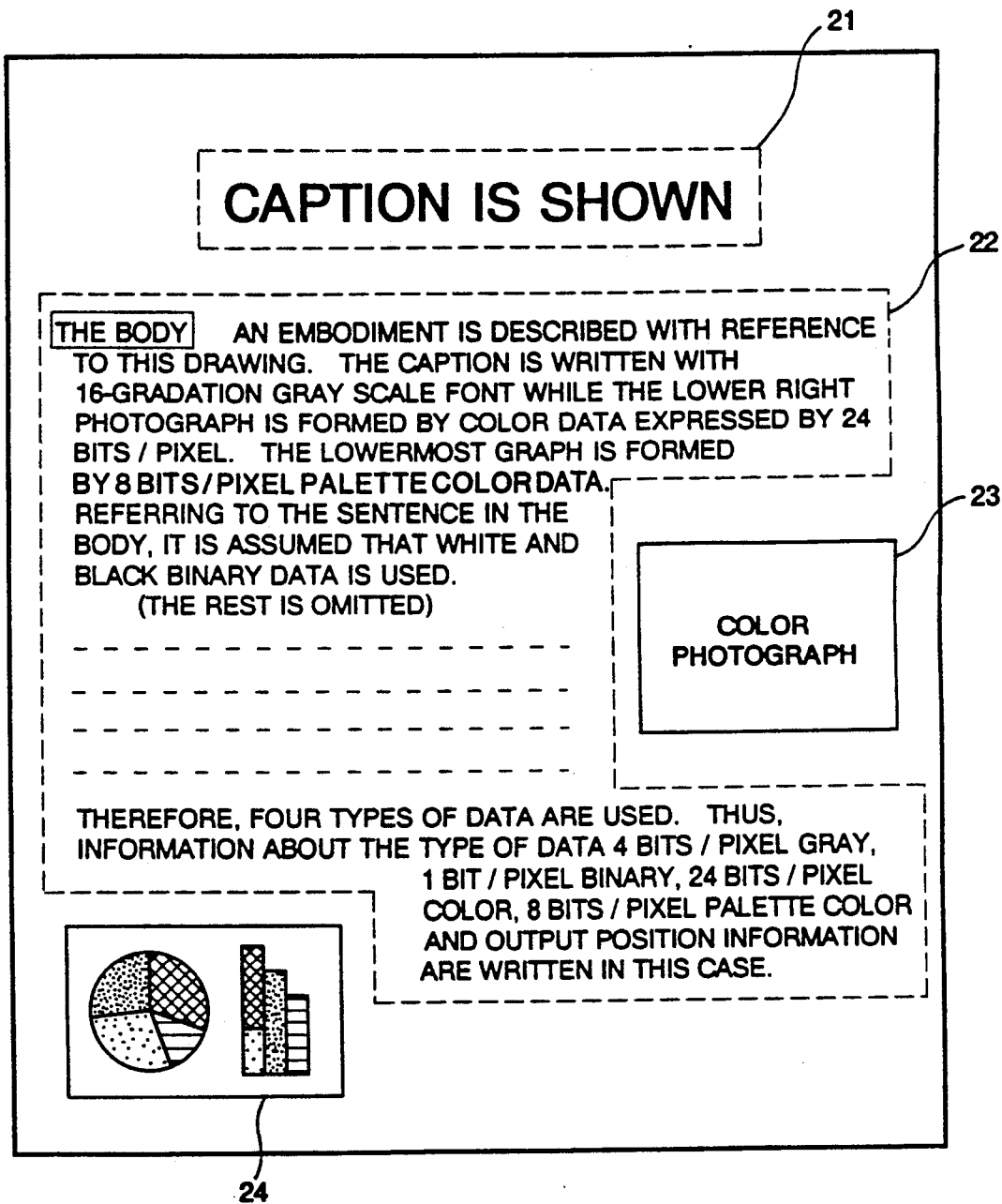
FIGS. 4A and 4B illustrate an example of an output obtained according to the present invention.

The operation of this embodiment will be described with reference to FIG. 4A. Referring to FIG. 4A, reference numeral 21 represents 4-bits/pixel data capable of expressing 16 gradations in white and black. Reference numeral 22 represents white and black binary 1-bit/pixel data and 23 represents 24-bits/pixel color data capable of expressing 16,700,000 colors in 256 gradations each in R, G and B. Reference numeral 24 represents 8 bits/pixel palette color data capable of simultaneously expressing 256 colors from among those 16,700,000 colors by using a color palette.

Figure 4B:
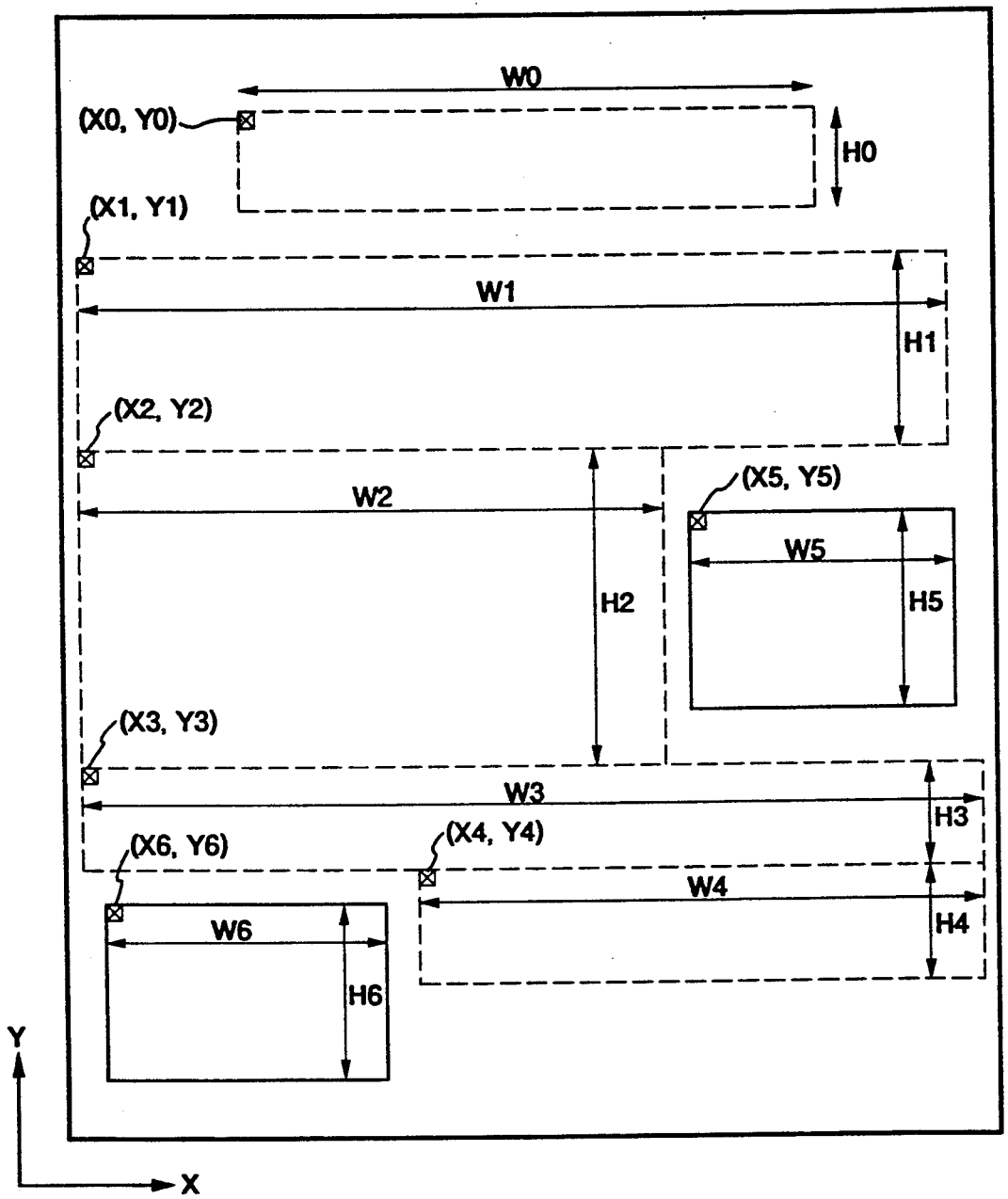

FIG. 4B illustrates the position and the size of each portion of the image shown in FIG. 4A. Referring to the drawing, a gray character portion 21 starts at a pixel address (X0, Y0) on the display frame (that is, the original to be read or the print sheet), the gray character portion 21 having a size of W0×H0. The other portions 22 to 24 are similarly arranged. A white and black portion 22 is sectioned into four rectangular blocks for convenience in processing.

Figures 5A, 5B:
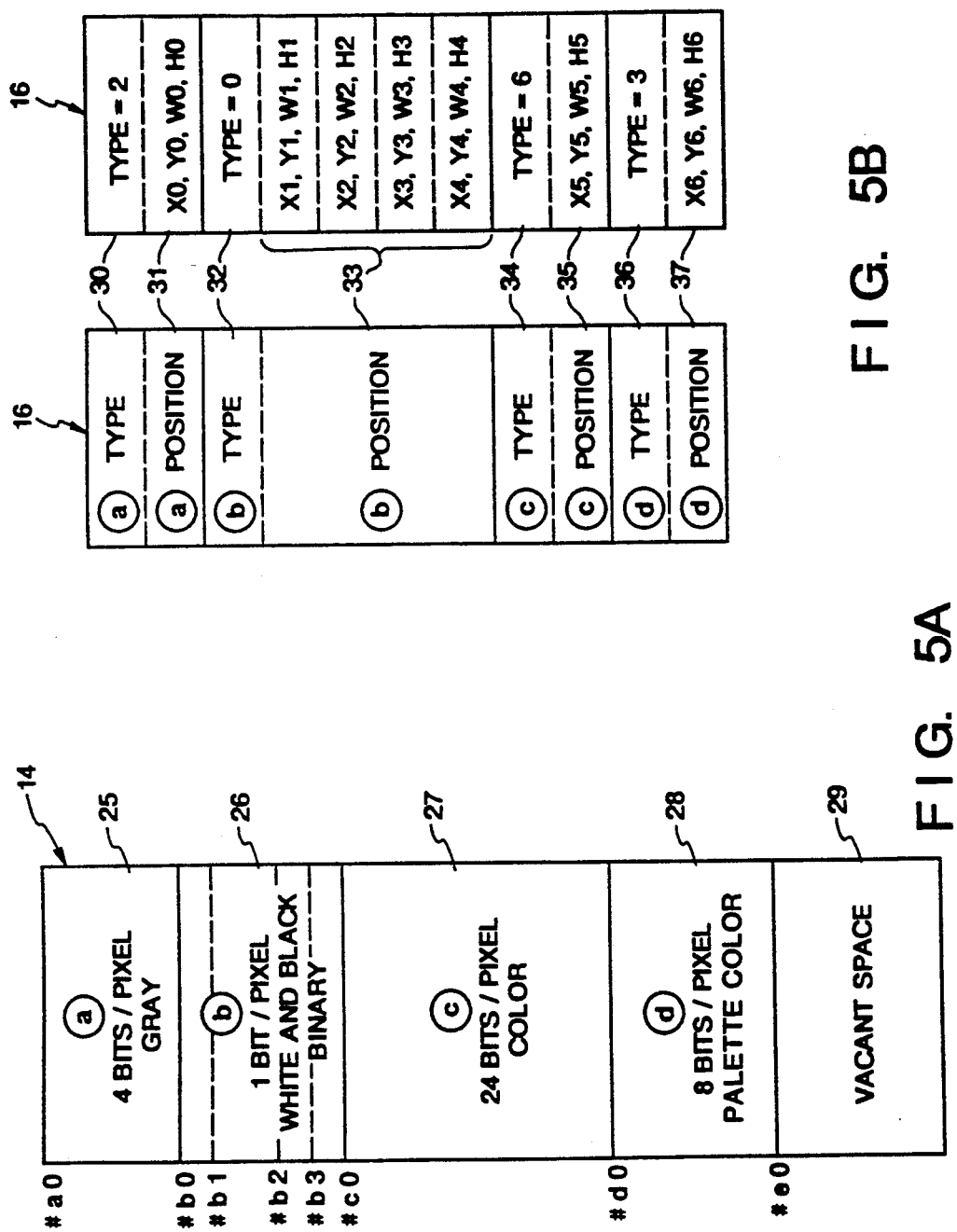

FIG. 5A illustrates the state where the each of the images shown in FIG. 4A is stored by the image memory 14. Referring to the drawing, an area 25 starting at address #a0 on the image memory 14 stores 4-bits/pixel gray image data e,crc/a/ , an area 26 starting at address #b0 stores 1-bit/pixel white and black binary image data (b), an area 27 starting at address #c0 stores 24-bits/pixel full color image data (c), and an area 28 starting at address #d0 stores 8-bits/pixel palette color image data (d). An area 29 starting at address #e0 is a vacant space area. The area 26 for the white and black binary image data (b) is sectioned into four areas which start respectively at addresses #b0, #b1, #b2 and #b3. Thus, the image memory 14 according to this embodiment does not store image data corresponding to the marginal portion of FIG. 4A.

FIG. 5B is a schematic view which illustrates the state in which the type and position information register 16 stores data. Referring to the drawing, reference numeral 30 represents the type of image data (a), 31 represents the I/O output pixel position of image data (a), 32 represents the type of image data (b), 33 the I/O output pixel position of image data (b), 34 represents the type of image data (c), 35 represents the I/O output pixel position of image data (c), 36 represents the type of image data (d) and 37 represents the I/O output pixel position of image data (d).

FIG. 5B schematically illustrates the contents of the storage in the type and position information register 16.

Referring to the drawing, the type of image data (a) is 2, the I/O output pixel position for the read original or the printing sheet is an area starting from (X0, Y0) and having a size (W0, H0). The type of the image data (b) is 0 and the I/O pixel position and size is an area (X1, Y1) and (W1, H1) and an area (X2, Y2) and (W2, H2), an area (X3, Y3) and (W3, H3) and an area(X4, Y4) and (W4, H4). The other image data items are similarly arranged.

FIG. 5C illustrates the code table for the type of the image data. Referring to the drawing, type 0 corresponds to 1 bit/pixel and type 2 corresponds to 4 bits/pixel. The other types are similarly arranged.

According to an example of the output shown in FIG. 4A, data for a character, a photograph, a graph and a figure is, as actual data, written in the image memory 14 as shown in FIG. 5A. Data concerned with the type of each of the actual data items and the output position is expressed by (X0, Y0) to (X6, Y6), W0 to W6, H0 to H6 and the like as shown in FIG. 4B so as to be written in the type/position information register 16 as shown in FIG. 5B.

As described above, the type and the position has been specified by means of software. Therefore, data is read out from the corresponding address by hardware at the time of the output in accordance with the output position so as to be transmitted after each of the data format has been converted into the data format for the output apparatus. At this time, the address corresponding to the output position is generated by the access address control circuit 17. FIG. 5D illustrates, corresponding to FIG. 4A, the address and the type of data corresponding to the output position and transmitted from the access address control circuit 17. The memory controller 15 controls the action of reading data from the memory. The output data conversion circuit 18 converts each of the data formats into the data formats for the output apparatus. The output apparatus i/f sends/receives a signal to and from the output apparatus.

Processing procedure of the First Example

The operation will be described with reference to a flow chart shown in FIG. 6.

Figure 6:
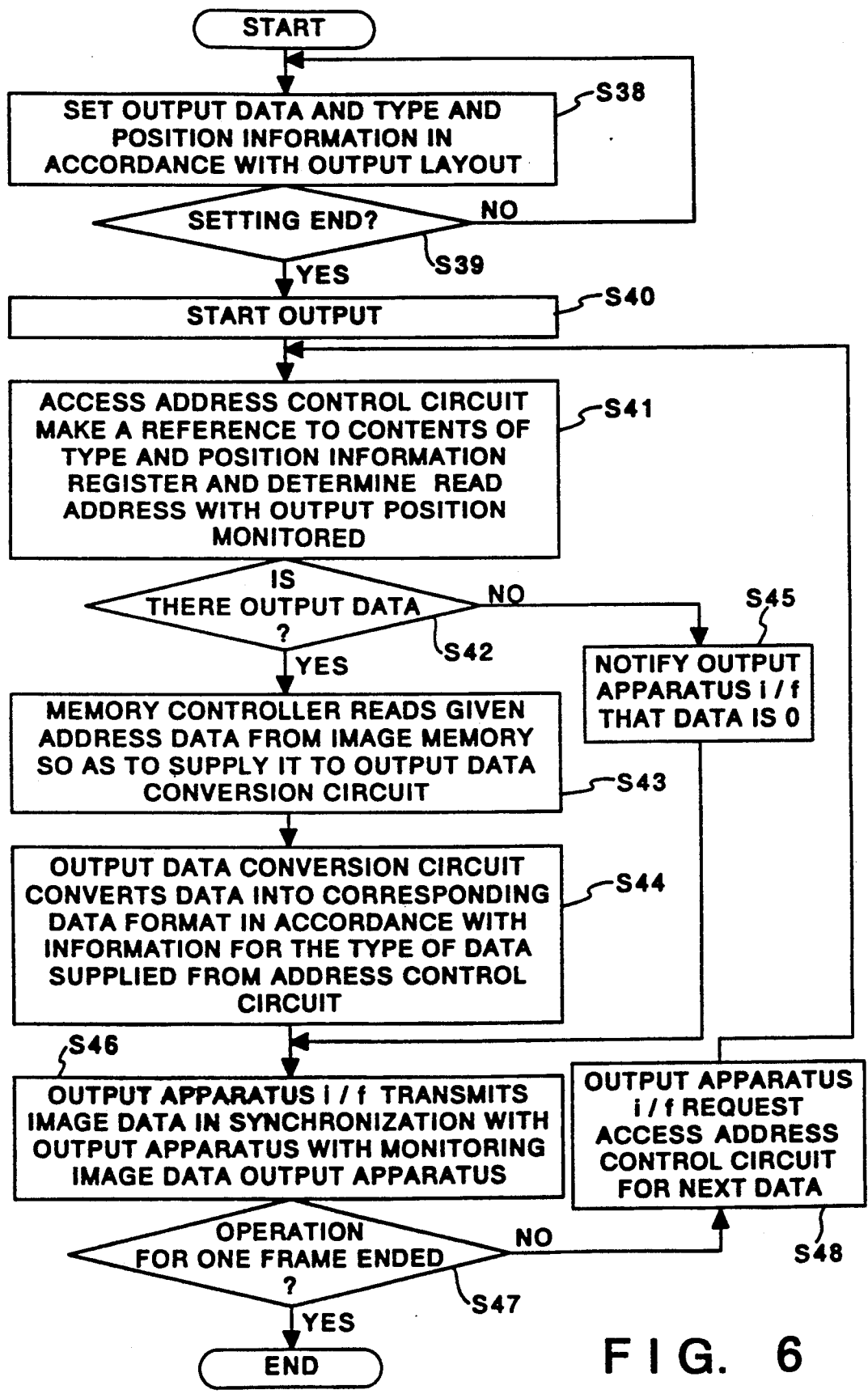
FIG. 6 is a flow chart which illustrates the procedure of the output processing performed by the image processing apparatus according to the present invention.

FIG. 6 is a flow chart which illustrates the printing process according to this embodiment. Referring to the drawing, in step S38, an operator makes a layout or inputs data on the CRT frame for the purpose of obtaining a desired printing processing for each of the images. In accordance with the thus made layout, information for the type of each of the image data and position of the output pixel is input. As a result, CPU 1 develops the character data or the like in such a manner that that code information is converted to dot data and image data is made a suitable format (a format packing in 1 bit/pixel, 4 bits/pixel or the like) depending upon the type. Furthermore, information for the type of each of image data, the position at which output to the output apparatus starts and size is written in the type and position information register 16. In step S39, it is determined whether or not the above-described setting has been ended. It it has been ended, the flow advances to step S40 in which a print command is issued to the output apparatus 20. Furthermore, a start flag for the access address control circuit 17 is set or the like so that the output operation is started. In step S41, the access address control circuit 17 makes a reference to the contents of the type and position information register 16 relating to the output pixel position in the output apparatus 20. Furthermore, it determines the address of the image data to be read from the image memory 14. In step S42, it is determined whether or not there is image data to be read from the image memory 14.

Now the relationship between the output pixel position and the read address of the image memory 14 in the access address control circuit 17 will be described with reference to FIG. 6. The scanning by the output apparatus 20 is performed from left to the right of the frame as the main scanning until the scanning reaches the right end portion. Then, the scanning is shift to the left end portion of the next line down so that the lines are mainly downwards scanned from the upper portion. Therefore, the first output pixel position in the output apparatus 20 is (0, 0). In the case of the image shown in FIG. 4A, the front portion of the paper sheet, that is, the area starting at the output pixel position (0,0) is a marginal portion. That is, the area starting at the output pixel position (0, 0) shown in FIG. 5D is arranged to have no read address. That is, there is no corresponding information in both the image memory 14 and the type and position information register 16. Furthermore, the type of the image data is 0 (1 bit/pixel). Therefore, the flow advances to step S45 in which a fact that output data is 0 (no data) is communicated to the output apparatus i/f 19. In step S46, the output apparatus i/f 19 transmits a signal (for example, Null) which corresponds to the marginal space in synchronization with the output apparatus 20 with monitoring the image data output pixel position. In step S47, it is determined whether or not the output of image data for one frame has been ended. If it has not been ended, the flow advances to step S48 in which the output apparatus i/f 19 requests the access address control circuit 17 for the next image data.

Thus, when the output pixel position reaches in front of (X0, Y0), the access address control circuit makes a reference to the contents of the type and position information register 16 in step S4. As a result, a coincidence with the output pixel position information is obtained. Then, the read address #a0 of the image memory 14 is transmitted from the table shown in FIG. 5D. Furthermore, image data type 2 is transmitted.

Since there is image data to be printed in the determination made in step S42, the flow advances to step S43 in which the memory controller 15 reads image data from the address #a0 of the image memory 14 so as to supply it to the data conversion circuit 18. In step S44, the data conversion circuit 18 has been previously notified that the type=2 (4 bits/pixel) by the access address control circuit 17. Therefore, it supplies image data for 32 bits latched by the latch circuit 46 to the selector 47. The selector 47 successively selects (unpacks) each 4 bits of the image data for the 32 bits so as to make a reference to the lookup table 48 in a unit of 4 bits for one pixel clock. Thus, the lookup table 48 supplies 24 bits/pixel RGB image data corresponding to each 4 bits to the output apparatus i/f 19. In step S46, the output apparatus i/f 19 transmits the RGB image data supplied from the data conversion circuit 18 in synchronization with a timing signal of the output position 20.

Thus the printing process is advanced until the output pixel position reaches (X0+W0, Y0). At this time, the read address becomes zero from the relationship shown in FIG. 6, and the type also becomes zero. Furthermore, when the output pixel position becomes (X0, Y0+10, the read address of the image memory becomes #(a0+W0/2) and the type becomes 2. That is, since the portion of the image memory 14 is 4 bits/pixel, the read address moves forward by W0/2 with respect to the increase WO of the output pixel position. The above-described operations from S41 to 46 are repeated until those for one frame are ended.

Specific Example of the Output Data Conversion Circuit

The output data conversion circuit 18 will be described more specifically with reference to FIG. 3. The 32-bit data read out from the image memory 14 is latched by a latch circuits 52 to 55 by 8 bits respectively. The outputs from the latch circuits 52 to 55 are supplied to the selectors 56 to 58 in which each 8 bits is selected. The way of the selection will be described with reference to the case where type=6 shown in FIG. 5C. In response to a command for each 8 bits for R, G and b and supplied from the control signal generating circuit 62, the selector 56 selects the output from the latch circuit 52, the selector 57 selects the output from the latch 53 and the selector 58 selects the output from the latch 54. Each 8 bits thus selected is respectively supplied to the LUTs 59, 60 and 61. Then, the selector 56 selects the output from the latch 55, the selector 57 selects the output from the latch 52 and the selector 58 selects the output from the latch 53. The above-described operation is repeated.

In the case where type=2 all of the selectors 56, 57 and 58 respectively selects the output from the latch 52. That is, the outputs from the selectors 56, 57 and 58 comprise the same data. The LUTs 59, 60 and 61 first respectively make a reference with the upper 4 bit such other color components as the supplied 8 bits so that data for red corresponding to the above-described 4 bits is transmitted from the LUT 59, data for green is transmitted from the LUT 60 and data for blue is transmitted from the LUT 61. Then, a reference to the lower bits of the 8 bits is made so that the corresponding data for red, green and blue is transmitted from each of the LUTs 59, 60 and 61.

As for other types of data, the similar operation is performed. That is, when the number of the bits necessary to express data for one pixel is 8 or less, the same data is supplied to the LUTs 59, 60 and 61 so as to the number of bits to be subjected to the reference is made correspond to the type of the data. When the number of the bits necessary to express data for one pixel is 8 or more, the selectors 56, 57 and 58 successively change the data to be selected.

Although three LUTs are employed according to this embodiment, another structure may be employed in which one LUT which receives 24 bits and transmits 8 bits is provided. The present invention is not limited to the above-described number of the bits. Furthermore, the present invention is not limited to the above-described output apparatus arranged to act on the basis of red, green and blue for realizing a color image. It may be replaced by an output apparatus arranged to act on the basis of Y, M, C and Bk or an apparatus arranged to act on the basis of a white and black multivalued method.

As described above, a variety of the image data can be stored on the same memory with the quantity of information maintained as it is. Therefore, data of a large quantity of information can be stored without a fear of lacking for the necessary information. Furthermore, a problem, taken place in that an excessively long time takes when data of a small quantity is written, can be overcome. Therefore, an output in a data format which adapts the output apparatus can be realized. As a result, an excellent quality output image can be obtained with a reduced memory capacity.

According to this embodiment, an image processing apparatus is provided, the memory capacity of which can be reduced and which exhibits a structural flexibility and an excellent efficiency in use of the memory thereof.

Figure 14:
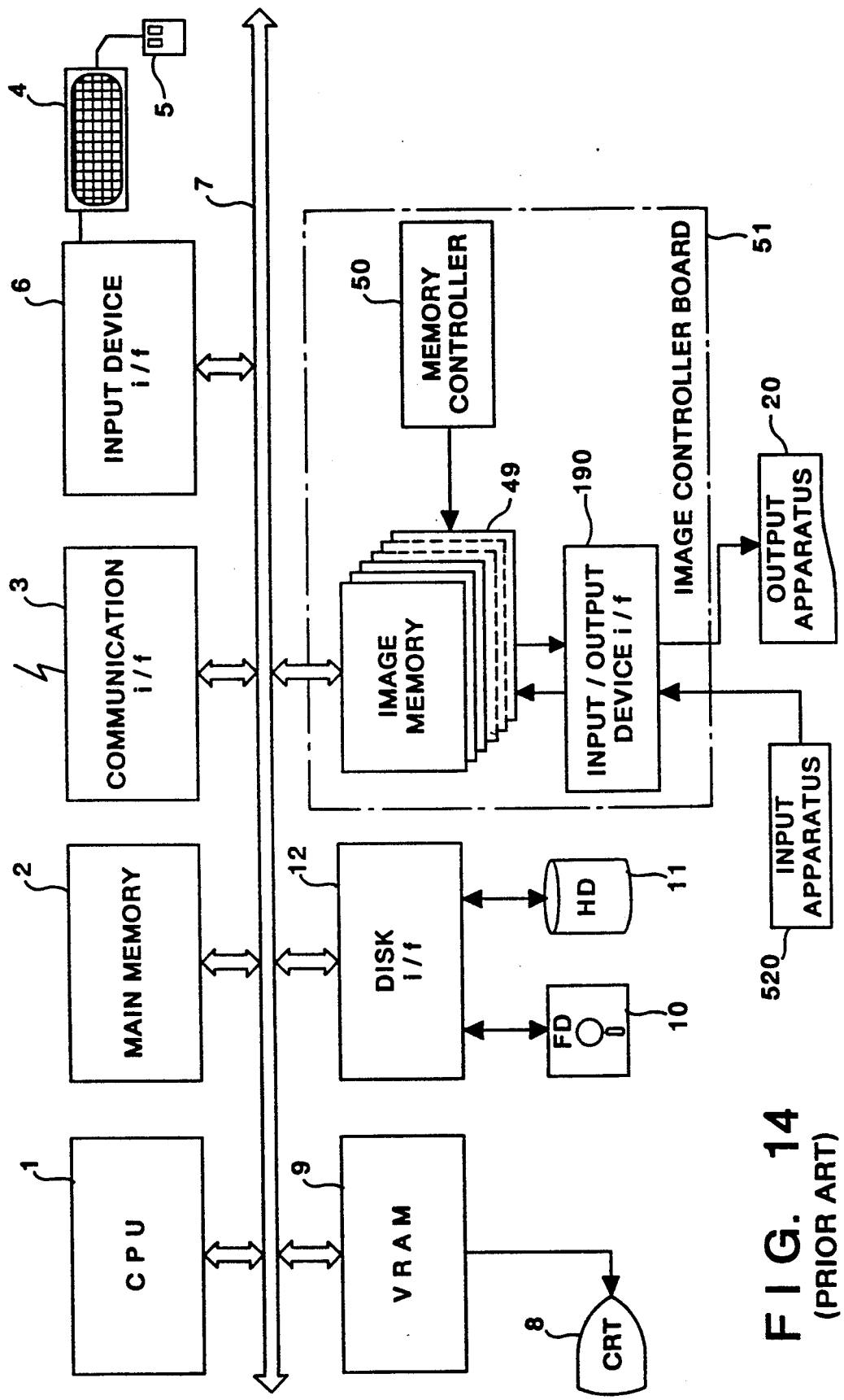

FIG. 14 is another block diagram which illustrates a conventional image processing apparatus. Referring to the drawing, reference numeral 1 represents a CPU for controlling the overall body of the apparatus and 2 represents a main memory for storing the program for the CPU 1 or serving as a work area used by the CPU 1. Reference numeral 3 represents a communication interface (a "communication i/f") for establishing a communication with a local area network (LAN) such as an ether net. Reference numeral 4 represents a keyboard through which a character code or the like is input and 5 represents a pointing device (PD) for instructing the position on the display frame. Reference numeral 6 represents an input device interface for establishing the communication between the keyboard or the PD 5 and the CPU 1. Reference numeral 7 represents a system bus for the CPU 1 and 8 represents a CRT display device (CRT) for displaying image data. Reference numeral 9 represents a video RAM (VRAM) for storing video data to be displayed on the CRT display device 8. Reference numeral 10 represents a floppy disk drive (FD) for storing a user file and 11 represents a hard disk drive (HD) for storing the system file. Reference numeral 12 represents a disk interface (a disk i/f) for connecting the FD 10 or HD 11 to the CPU 1. Reference numeral 20 represents an output apparatus such as a printer, and 520 represents an input apparatus such as a scanner. Reference numeral 190 represents an I/O device interface ("I/O device i/f") connects the input apparatus 520 and the output apparatus 20 to this system. Reference numeral 49 represents an image memory for storing image data, 50 represents a memory controller for controlling reading and writing to and from the image memory 49 and 51 represents an image controller board.

According to the thus constituted conventional apparatus, in the case where the printer 20 is an 8-bits white, black and gray printer, bit 0 has been converted into multivalued image data 00H and also bit 1 has been converted into multivalued image data FFH so as to be developed on the image memory 49 even though the data for the image is 1-bit/pixel character pattern data.

In the case where a scanner 520 is an 8-bits white, black and gray scanner, multivalued image data 00H to FFH, read by the scanner, are, as is, stored in the image memory 49 even though the original image is constituted by white and black characters.

As described above, according to the conventional apparatus, when once the number of the bits for one pixel is determined in the system, the number of the bits for the pixel data to be stored in the image memory 49 is not changed regardless of the fact that the data is binary image data, multivalued image data or color image data. Therefore, the image memory cannot be used efficiently and the accessing operation to the image memory cannot be performed efficiently.

Second Structural Example

Figure 7:
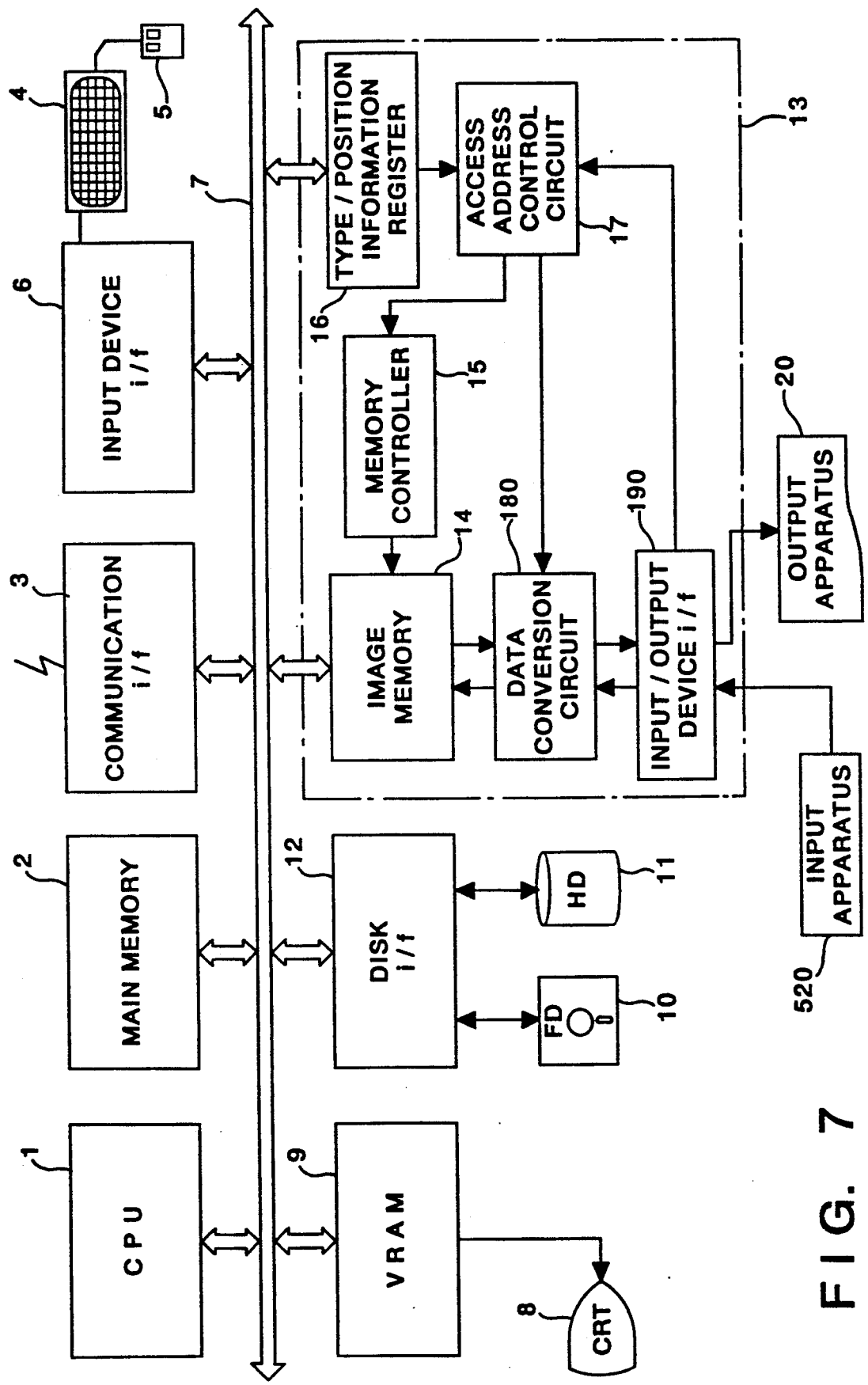
FIG. 7 is a block diagram which illustrates a second embodiment of the image processing apparatus according to the present invention.

FIG. 7 is a block diagram which illustrates the structure of the image processing apparatus according to another embodiment of the present invention. The same elements as those shown in FIGS. 1, 13 and 14 are given the same reference numerals and their descriptions are omitted here. Referring to the drawing, reference numeral 2 represents a main memory for storing programs for the overall body of the print processing shown in FIG. 10, the print processing shown in FIG. 6 and the scanner reading processing shown in FIG. 11. Reference numeral 14 represents an image memory for storing a variety of image data such as 1 bit/pixel bit map data, 4 bits/pixel gray data, and full color data of 8 bits for each of R, G and B in such a manner that the variety of the image data are efficiently mixed with one another. The memory capacity of the image memory 14 can be enlarged or reduced if necessary. Reference numeral 15 represents a memory controller for controlling the reading and writing data to and from the image memory 14. Reference numeral 16 represents a type/-position information register for storing information for the type of the image data to be stored in each portion of the image memory 14 (that is, information corresponding to the number of bits for one pixel), making it correspond to information for the start position on the original, printing paper or the display frame for the image data (that is, information for the output pixel position for the recording material or the frame) and for the size. Reference numeral 180 represents a data conversion circuit for converting image data read from the image memory 14 into image data (8-bits/pixel RGB data or the like) in the format which can adapt to the output apparatus 20 in accordance with information for the type (1 bit/pixel, 4 bits/pixel or the like). The data conversion circuit 180 converts, as an alternative, image data (8-bits/pixel RGB data or the like) supplied from the input apparatus 520 into image data the memory development format of which corresponds to information for the type (1 bit/pixel, 4 bits/pixel or the like). Reference numeral 190 represents an "I/O apparatus interface (an I/O apparatus i/f") for sending and receiving image data in a suitable format to and from the I/O apparatuses 520 and 20. Furthermore, the I/O apparatus interface 190 receives a variety of operation timing signals (a VSYNC signal, an HSYNK signal, a pixel clock signal or the like) supplied from the I/O apparatuses 520 and 20 so as to transmit a variety of synchronizing signals for the purpose of detecting the present position of the pixel of the original image to be read or the present position of the pixel on the printing paper to be printed. Reference numeral 17 represents an access address control signal for controlling the determination of the type and the address of the image data to be read from the image memory 14 or determination of the type and the address of the image data to be written on the image memory 14. Reference numeral 13 represents an image interface board on which the above-described structures 14 to 17, 180 and 190.

Example of the Structure of the Output Apparatus

Figure 12:
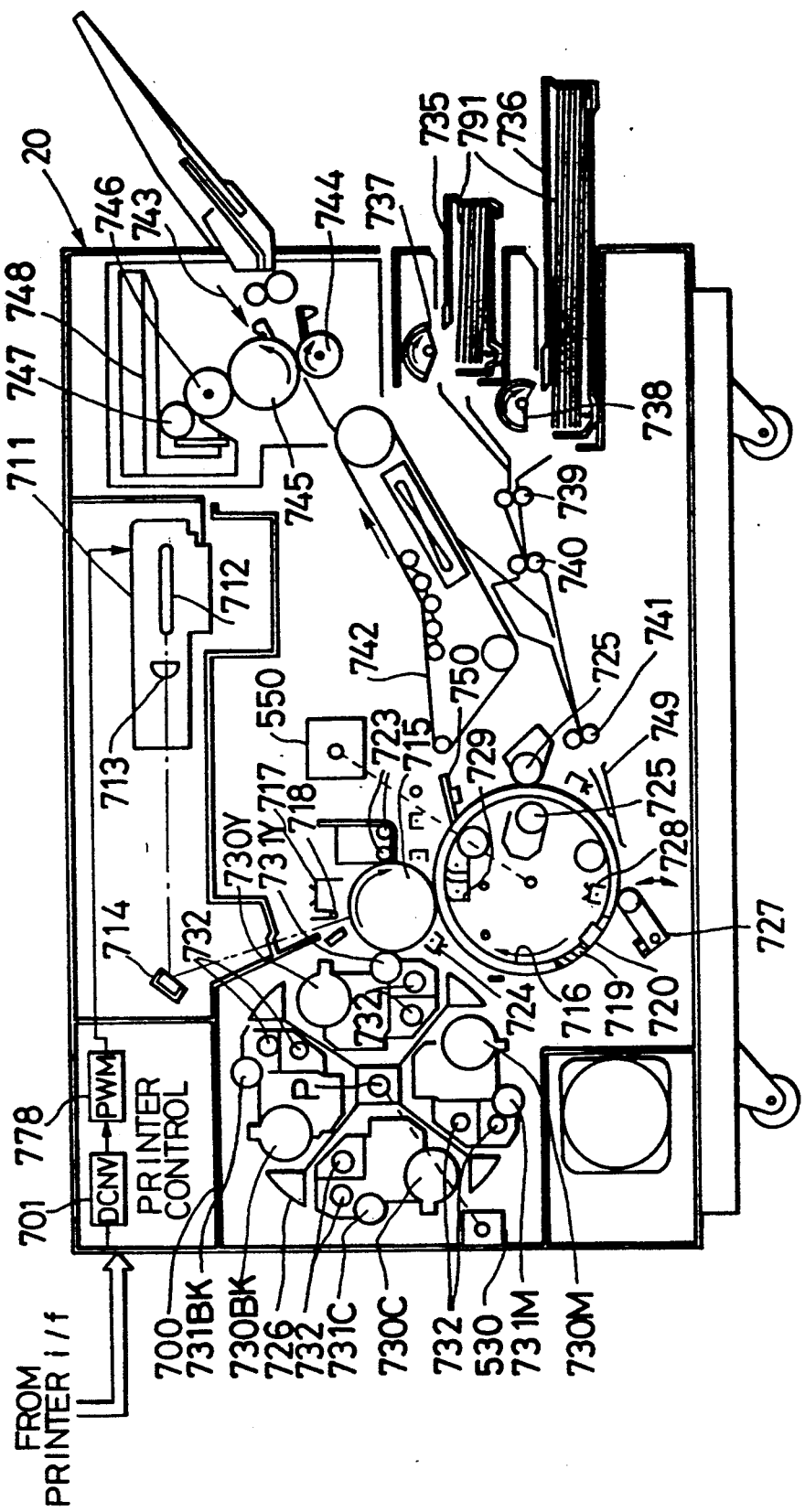
FIG. 12 illustrates the structure of a full color printer 200 connected to the image processing apparatus according to the second embodiment.

As the output apparatus 20 to be connected to the image processing apparatus according to this embodiment, the structure of a full color printer will be described with reference to FIG. 12. Referring to the drawing, reference numeral 701 represents a data conversion circuit (DCNV) for converting R, G and B data supplied from the I/O apparatus i/f 190 into analog image signals Y, M, C and Bk. Reference numeral 778 represents a pulse-width-modulation (PWM) circuit for forming a binary image signal the pulse width of which has been modulated by making a comparison between the analog image signal with a triangular signal with a predetermined period. The binary image signal is supplied to an ensuing laser output portion 711 so that a laser diode is ON/OFF modulated. As a result, a gradation image can be formed. Reference numeral 711 represents a beam scanner comprising a laser output portion for converting the binary image signal supplied from the PWM circuit 778, a polygonal mirror 712 of a polygonal body (for example, an octahedron), a motor (omitted from the illustration) for rotating the polygonal mirror 712 at high speed and an f/θ lens (an imaging lens) 713. Reference numeral 714 represents a reflecting mirror for changing the optical passage through which the laser beam travels. Reference numeral 715 represents a photosensitive drum. As a result of the thus constituted structure, the laser beam emitted from the laser output portion is reflected by the polygonal mirror 712 before it passes through the f/θ lens 713 and the mirror 714 so as to linearly scan (raster scan) the surface of the photosensitive drum 715. As a result, a latent image which correspond to the image data is formed. Furthermore, reference numeral 717 represents a primary charger, 718 represents a full surface exposure lamp, 723 represents a cleaner portion for recovering residual toner which has not be transferred and 724 represents a pre-transference charger. The above-described elements are disposed around the photosensitive drum 715. Reference numeral 726 represents a developing machine unit for developing a static latent image formed on the surface of the photosensitive drum 715. Reference numerals 731Y, 731M, 731C and 731Bk respectively represent developing sleeves which come in contact with the photosensitive drum 715 so as to perform direct development. Reference numerals 730Y, 730M, 730C and 730Bk respectively represent toner hoppers for accumulating spare toner for each of the colors. Reference numeral 732 represents a screw for conveying the developer for each of the colors. A developing machine unit 726 is constituted by the above-described sleeves 731Y to 731Bk, the toner hoppers 730Y to 703Bk and the screw 732. The above-described elements are disposed around the rotational axis P of the developing machine unit. As a result, when a yellow toner image is formed, the development operation with the yellow toner is performed at the position as shown in the drawing. When a magenta toner image is formed, the developing sleeve 731M in the magenta developing machine is moved to a position at which it comes in contact with the photosensitive body 715 by rotating the developing machine unit 726 relative to the axis P. The development of the cyane toner image and that of the black toner image are similarly performed.

Reference numeral 716 represents a transfer drum for transferring the toner image formed on the photosensitive drum 715 and 719 represents an actuator plate for detecting the position to which the transfer drum 716 has been moved. Reference numeral 720 represents a position sensor which approaches the actuator plate 719 so as to detect the movement of the transferring drum 716 to the home position. Reference numeral 725 represents a transfer drum cleaner, 727 represents a paper holding roller, 728 represents an electricity remover and 729 represents a transference charger. The above-described elements 719, 720, 725, 727 and 729 are disposed around the transfer drum 716.

Reference numerals 735 and 736 represent paper feeding cassette for accommodating paper sheets 791. Reference numerals 737 and 738 represent paper supply rollers for feeding the paper sheets 791 from the cassettes 735 and 736. Reference numerals 739, 740 and 741 respectively represent timing rollers for arranging timing for the supply and the conveyance of the paper sheets 791. The paper sheet 791 which has passed through the above-described elements is guided by a paper guide 749, as a result of which it is wound around the transferring drum 716 with the front end portion thereof held by a gripper, to be described later. Then, the process is shifted to the image forming operation.

Reference numeral 550 represents a motor which rotates the photosensitive drum 715 and the transfer drum 716 in a synchronization manner. Reference numeral 750 represents a removing claw for removing the paper sheet 791 from the transfer drum 716 after the image has been formed. Reference numeral 742 represents a conveyance belt for conveying the paper sheet 791 which has been removed from the transfer drum 716. Reference numeral 743 represents an image fixing portion for fixing the image on the paper sheet 791 which has been conveyed by the conveyance belt 742. The image fixing portion 743 comprises a pair of thermal pressure rollers 744 and 745.

Example of the Structure of the Data Conversion Circuit

Figure 8:
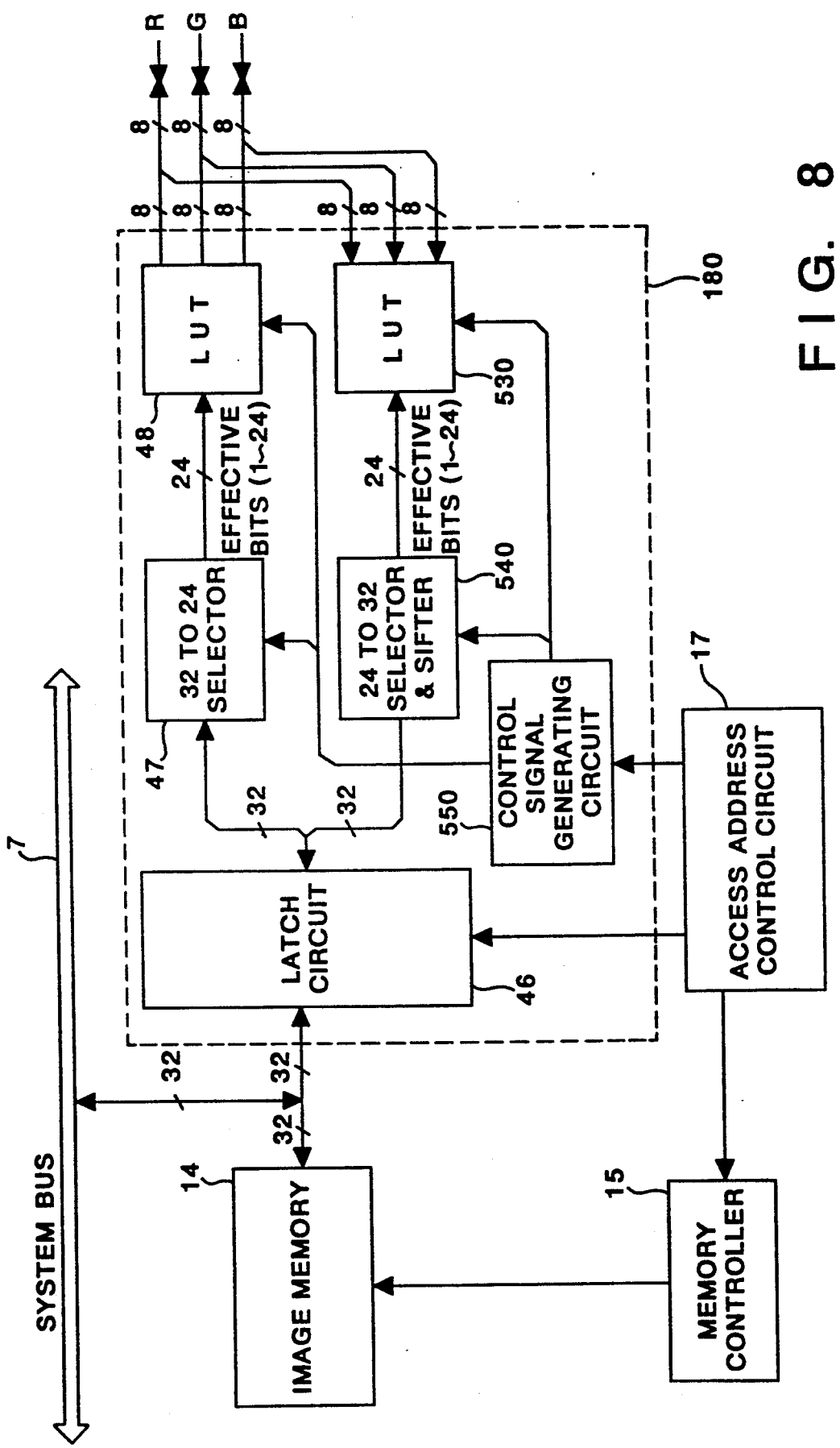
FIG. 8 is a block diagram which illustrates the data conversion circuit 180 shown in FIG. 7.

FIG. 8 is a block diagram which illustrates the data conversion circuit 180 according to this embodiment. Referring to the drawing, the image memory 14 is able to access to data for 32 bits at a stretch. Reference numeral 46 represents the latch circuit for temporarily latching image data read out from the image memory 14 at the time of outputting the image, while the same latches image data to be written in the image memory 14 at the time of inputting the image. Reference numeral 47 represents the selector for selecting image data of the number of bits corresponding to the type (1 bit/pixel, 4 bits/pixel or the like) of the image data from the supplied 32 bits for the purpose of successively transmitting the selected image data. Reference numeral 48 represents the lookup table (LUT) for converting each of the image data (1 bit/pixel, 4 bits/pixel or the like) supplied from the selector 47 into image data (8-bits/pixel RGB image data) in the form proper to the output apparatus 20. That is, the lookup table 48 serves as a color palette similarly to the first embodiment. Reference numeral 530 represents a lookup table (LUT) for converting image data (8-bits/pixel RGB image data) supplied from the input apparatus 520 into image data (1 bit/pixel, 4 bits/pixel or the like) in the storage format which corresponds to the predetermined type. Reference numeral 540 represents a selector/shifter for collectively transmitting image data supplied from the lookup table 530 in a unit of 32 bits. Reference numeral 550 represents a control signal generating circuit for generating a variety of control signals such as a signal for converting data.

Figure 9:
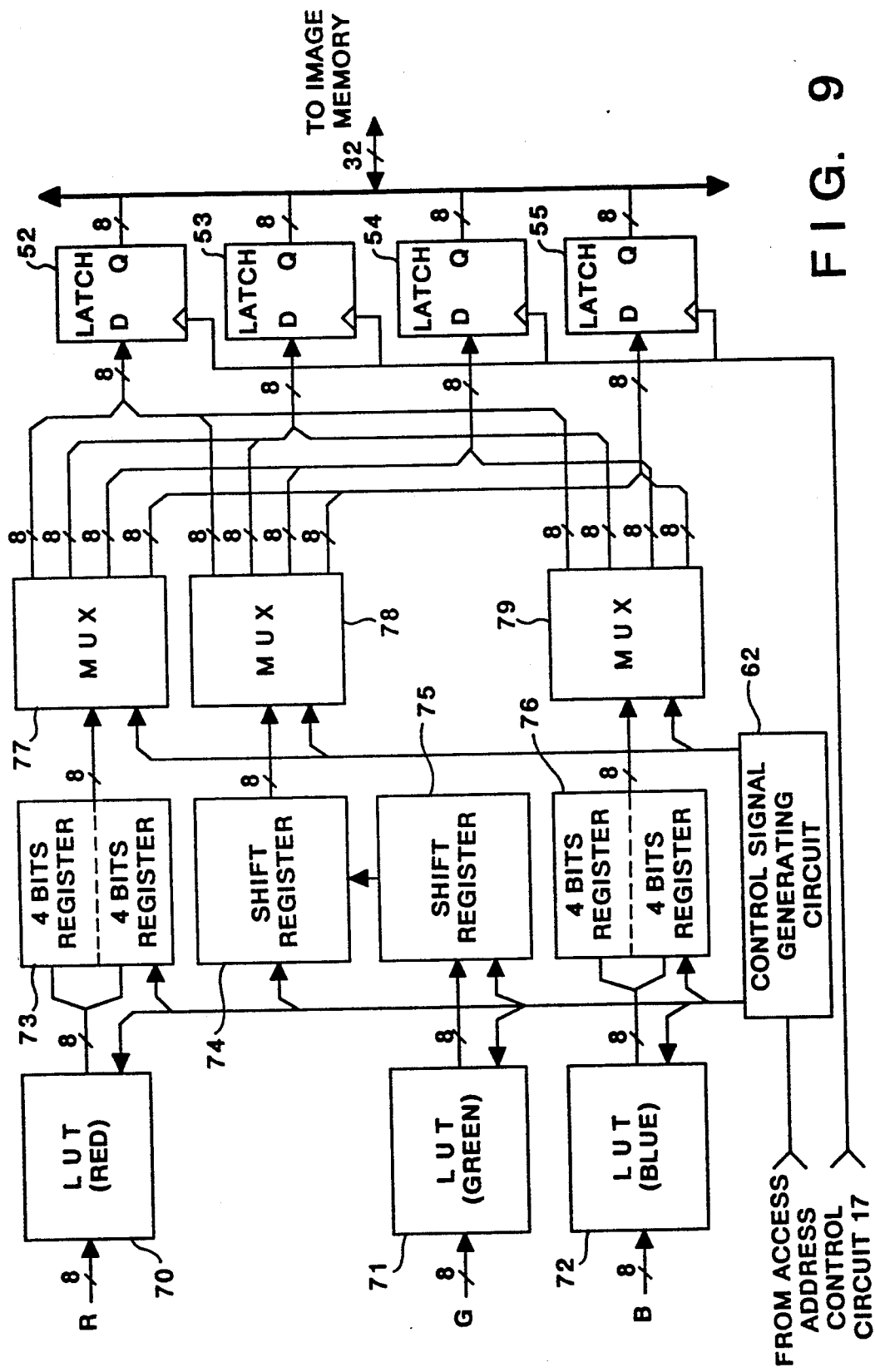
FIG. 9 specifically illustrates the data conversion circuit shown in FIG. 7.

FIG. 9 further specifically illustrates the block shown in FIG. 8. The latch circuits shown in FIG. 3 may be employed. In this case, a selector for selecting I/O must be provided.

8-bits data for R, G and B supplied from the input apparatus 520 is converted by the LUT 70, 71 and 72 corresponding to the type of the data shown in FIG. 5C. Then, the thus converted data is transmitted to 8-bits registers 73 and 76 each of which is constituted by two 4-bit registers and to a shift register 75. According to this embodiment, since the lightness of white and black corresponds to the density of green (G), white and black data of types 0 to 3, 5 or the like store data for green. However, the data may be extracted from the total relationship among R, G and B although the circuit becomes considerably complicated.

The manner of selection will be described. In the case where type=6 as shown in FIG. 5C, the output from the MUX 77 which is the same as the output from the LUT 70 is supplied to the input of the latch circuit 52, the output from the MUX 78 which is the same as the output from the LUT 71 is supplied to the input of the latch circuit 53 and the output from the MUX 79 which is the same as the output from the LUT 72 is supplied to the input of the latch circuit 53 in response to a command issued by the control signal generating circuit 62 for 8 bits for R, G and B. Then, the output from the MUX 77 is supplied to the latch 55 so that 32 bits of data are written in the image memory. Then, the output from the MUX 78 is supplied to the input of the latch 52 and the output from the MUX 79 is supplied to the input of the latch 53 after the respective selection have been performed.

In the case where type=2, only the output from the LUT 71 is latched in the shift register 75, and then 4 bits are shifted so as to shift the lower 4 bits to the shift register 74 so as to be coupled with the lower 4 bits of the output from the LUT 71. As a result, 8-bit data is formed so as to be written in the image memory with successively latched, by the MUX 78, in the sequential order: the latch 52, 53, 54, 55 and 52.

In the case where type=4, the coupling of the lower 4 bits is performed by the registers 73 and 76. Although no description is made about black (Bk) formed by removing the base color in FIG. 9, a known base color removal operation is performed in the case where type=7 so that the forming of Bk is latched by the latch 55.

As for data of other types, a similar operation is performed. When the number of bits necessary to express data for one pixel is 8 or less, the coupling is performed by the registers 73 and 75 or the shift registers 74 and 75 so as to make the number of bits correspond to the type of the data. In the case where the number of bits necessary to express data for one pixel is larger than 8, data selected by each of the MUXs 77, 78 and 79 is successively Processing procedure of the Second Example FIG. 10 illustrates the overall processing procedure of the structure shown in FIG. 7.

Figure 10:
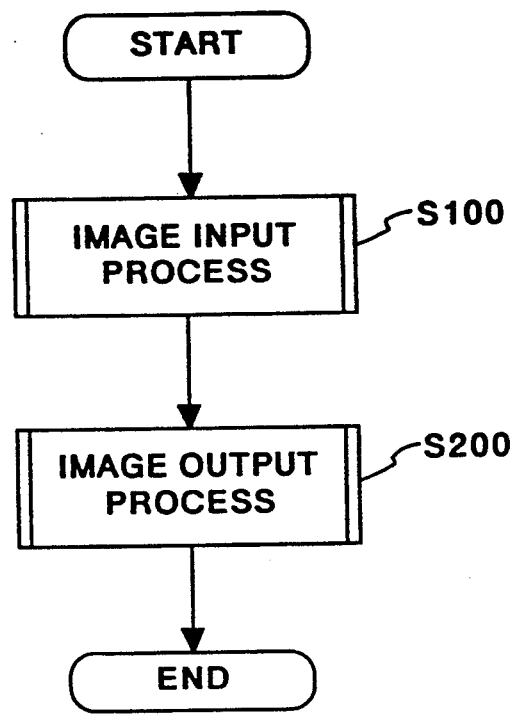
FIG. 10 is a flow chart which illustrates the procedure of processing performed by the image processing apparatus shown in FIG. 7.

Referring to FIG. 10, an image input processing, to be described later, is performed in step S100 so as to input the image to the image memory 14. Then, the image is, in step S200, transmitted to the printer in accordance with the procedure shown in FIG. 6.

Figure 11:
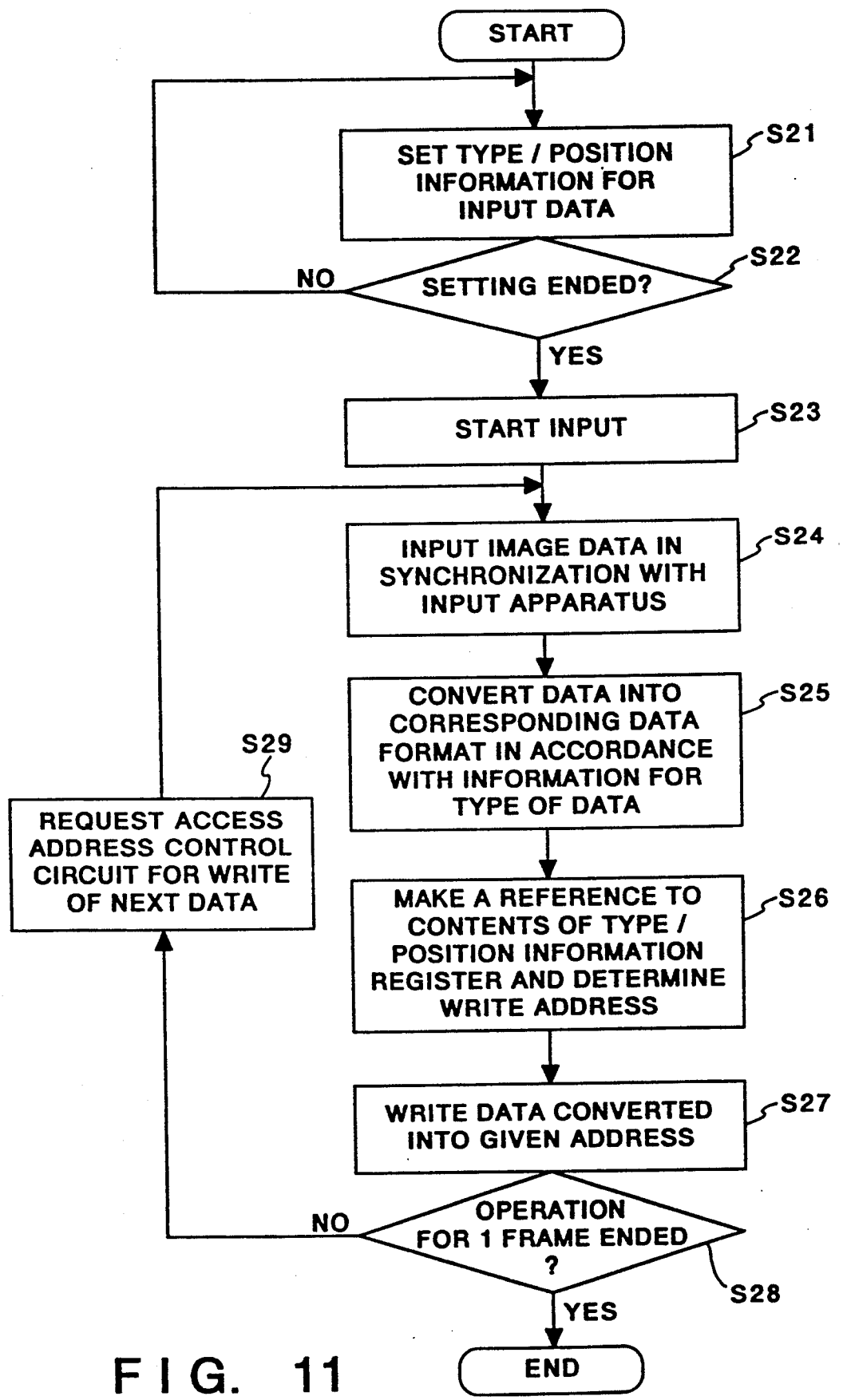
FIG. 11 is a flow chart which illustrates the processing of inputting image data.

FIG. 11 is a flow chart for the image data input processing. Referring to the drawing, step S21 is a step in which an operator determines a desired layout depending upon the configuration of the original sentence, figure and image to be read and set the position of the input pixel and the type of the image data for the block for each of the images to be input by the input apparatus 520 to the type/position information register 16. In step S22, it is determined whether or not the setting has been completed. It the determination has been completed, the flow advances to step S23 in which the input apparatus 520 and the I/O apparatus i/f 190 are started. In step S24, the I/O apparatus i/f 190 receives 24 bits/pixel RGB image data in synchronization with the input apparatus 520. In step S25, the data conversion circuit 180 converts data for image to be read into image data (1 bit/pixel, 4 bits/pixel or the like) in the corresponding format in accordance with information for the type of the image data. In step S26, the access address control circuit 17 makes a reference to the contents of the type/position information register 16 so as to determine the address for writing in the image memory 14 from the relationship shown in FIG. 5D. In step S27, the memory controller 15 writes the thus converted image data in the determined address in the image memory 14. In step S28, it is determined whether or not the writing for one frame has been completed. If it has not been completed, the flow advances to step S29 in which the I/O apparatus i/f 190 request the access address control circuit 17 to write the next image data. The processing from step S24 to step S27 is repeated until the processing for one frame is completed.

The present invention is not limited to the above-described various bits/pixel.

Although the image data for R, G and B is employed, it may instead be Y, M, C and Bk. Alternatively, a half-tone image may be formed by white and black multivalued data.

As described above, according to the present invention, a variety of image data may be efficiently mixed with one another on the same memory without lacking for the respective information quantity. Therefore, the storage efficiency can be significantly improved. Furthermore, the necessity of forming the memory capacity by data having the largest quantity of information for one frame can be eliminated. The memory can be efficiently used by changing the type of data in accordance with the overall memory capacity. Furthermore, the restriction from the data format of the I/O apparatus can be eliminated.

Although the invention has been described in its preferred form with a certain degree of particularity, it is to be understood that the present disclosure of the preferred form can be changed in the details of construction and that various combinations and arrangements of parts may be resorted to without departing from the spirit and the scope of the invention as hereinafter claimed.

What is claimed is:

1. An image processing apparatus comprising:
   first storage means for storing image data having a plurality of areas, at least two of the plurality of areas being respectively filled with different pixel data represented by different quantities of information;
   second storage means for storing area information of the image data including quantity-data defined as a quantity of information representing one pixel and area-data defined as an output position data of each storage area with one area information per each of the plurality of areas;
   means for determining an outputting order of a pixel data in accordance with the output position data and a predetermined outputting sequence of the image data;

reading means for reading pixel data from said first storage means in accordance with the outputting order determined by said determining means and the quantity-data; and output means for converting the pixel data read by said reading means in the outputting order into output data predetermined in accordance with the quantity-data and for outputting the output data.

2. An image processing apparatus according to claim 1, wherein said output mean includes a lookup table for converting said pixel data read by said reading means into data which corresponds to the output in accordance with information about a type of image data in each storage area.

3. An image processing apparatus according to claim 1, wherein said image data includes binary data, and plural-bit gradation data or color data which expresses each color component by a plurality of bits per pixel.

4. An image processing apparatus comprising:

first storage means for storing image data in unit of pixel;

output means for outputting the image data in a manner of scanning an image in unit of pixel;

second storage means for storing area information of the image data including a pixel format of the image data stored in said first storage means in accordance with an output position to said output means; and conversion means for converting the image data read from said first storage means in accordance with the output position into an output format of image data to be output to said output means; said output format being predetermined in accordance with the pixel format.

5. An image processing apparatus according to claim 4 further comprising input means for inputting said image data and conversion means for converting said image data inputted from said input means into data to be written in said first storage means in accordance with said information in said second storage means.

6. An image processing apparatus according to claim 4, wherein the image data includes binary data and plural-bit gradation data or color data which expresses each color component by a plurality of bits per pixel.

7. An image processing apparatus comprising:

first storage means for storing image data having two of the plurality of areas being respectively filled with different fixed data represented by different quantities of information;

second storage means for storage area information of the image data including quantity-data defined as a quantity of information representing one pixel and area-data defined as an output position data of each storage area with one area information per each of the plurality of areas; and means for determining an outputting order for a pixel data in accordance with the output position data and a predetermined outputting sequence of the image data.

8. An image processing apparatus according to claim 7, wherein the image data includes binary data, and plural-bit gradation data or color data which expresses each color component by a plurality of bits per pixel.

9. An image processing apparatus for processing an image in which pixel data have different numbers of bits per pixel or different formats, or both, said apparatus comprising:

first storage means for storing image data including a plurality of kinds of pixel data without a gap between every two pixel data;

second storage means for storing area information defined as data representing an area in which each pixel is represented by the same number of bits and format, and format information defined as a number of bits and format representing one pixel in an area represented by the area information; and reading means for reading the pixel data from said first storage means in order of raster-scanning of the image on the basis of the area information stored in said second storage means.

10. An image processing method comprising the steps of:

storing image data having a plurality of areas, at least two of the plurality of areas being respectively filled with different pixel data represented by different respective quantities of information;

storing area information of the image data including quantity-data defined as a quantity of information representing one pixel and area-data defined as an output position data of each area with one area information per each of the plurality of areas;

determining an outputting order of a pixel data in accordance with the output position data and a predetermined outputting sequence of the image data;

reading pixel data stored in the image-data storing step in accordance with the outputting order determined in the determining step and the quantity data;

converting the pixel data being read in the reading step into output data predetermined in accordance with the quantity-data; and outputting the output data.

11. An image processing method according to claim 10, wherein the image data includes binary data, and plural-bit gradation data or color data which expresses each color component by a plurality of bits per pixel.

12. An image processing method comprising the steps of:

storing image data in unit of pixel;

storing area information of the image data including a pixel format of the image data stored in the image-data storing step in accordance with an output position to be used in outputting the image data;

converting the image data stored in the image-data storing step in accordance with the output position into an output format of image data to be output, the output format being predetermined in accordance with the pixel format; and outputting the image data in a manner of scanning an image in unit of pixel.

13. An image processing method according to claim 12, further comprising the steps of:

inputting the image data to be stored in said image-data storing step; and converting the image data input in said inputting step into data to be written in said image-data storing step in accordance with the information stored in said area-information storing step.

14. An image processing method according to claim 12, wherein the image data includes binary data, and plural-bit gradation data or color data which expresses each color component by a plurality of bits per pixel.

15. An image processing method comprising the steps of:

storing image data having a plurality of areas, at least two of the plurality of areas being respectively filled with different pixel data represented by different respective quantities of information;

storing area information of the image data including quantity-data defined as a quantity of information representing one pixel and area-data defined as an output position data of each area with one area information per each of the plurality of areas; and determining an outputting order of a pixel data in accordance with the output position of the pixel data and a predetermined outputting sequence of the image data.

16. An image processing apparatus according to claim 15, wherein the image data includes binary data, and plural-bit gradation data or color data which expresses each color component by a plurality of bits per pixel.

17. An image processing apparatus for processing an image in which pixel data have different bits or different formats, or both, comprising the steps of:

storing image data including a plurality of kinds of pixel data without a gap between every two kinds of pixel data;

storing area information defined as data representing an area in which each pixel is represented by the same number of bits and format, and format information defined as a number of bits and format representing pixels in an area represented by the area information; and reading means for reading the image data stored in the image-data storing step in order of raster-scanning of the image on the basis of the area information stored in the area-information storing step.

* * * * *

UNITED STATES PATENT AND TRADEMARK OFFICE
CERTIFICATE OF CORRECTION

PATENT NO. : 5,295,000
DATED : March 15, 1994
INVENTOR(S) : HIROSHI NONOSHITA ET AL.     Page 1 of 4

It is certified that error appears in the above-identified patent and that said Letters Patent is hereby corrected as shown below:

On title page,

AT [57] ABSTRACT

Line 5, "quantity" should read
--quantity (bits per pixel)--.

COLUMN 1

Line 15, "image wherein" should read --image data in which multivalued image (wherein--.
Line 16, "bit data in which multival-" should read --bit)--.
Line 17, "usd image," should be deleted, "wherein" should read --(wherein-- and "bit" should read --bit)--.

COLUMN 3

Line 45, "EMBODIMENT" should read --EMBODIMENTS--.
Line 65, "passes" should read --pass--.

COLUMN 4

Line 17, "FFH" should read --$FF_H$--.

COLUMN 5

Line 40, "the"(second occurence) should be deleted.
Line 44, "data e,crc/a/," should read --data ⓐ,--

UNITED STATES PATENT AND TRADEMARK OFFICE
CERTIFICATE OF CORRECTION

PATENT NO. : 5,295,000
DATED : March 15, 1994
INVENTOR(S) : HIROSHI NONOSHITA ET AL.    Page 2 of 4

It is certified that error appears in the above-identified patent and that said Letters Patent is hereby corrected as shown below:

COLUMN 6

Line 53, "that" (second occurrences) should be deleted.
    Line 62, "It" should read --If--.

COLUMN 7

Line 12, "shift" should read --shifted--.

COLUMN 8

Line 12, "by 8 bits respectively." should read --which each take 8 bits--.
    Line 17, "b" should read --B--.
    Line 32, "bit such" should read --bit of--.
    Line 33, "other color components as" should be deleted.
    Line 41, "the" should read --a--.
    Line 59, "of Y," should read --of such other color components as Y,--.

COLUMN 9

Line 50, "OOH" should read --$00_H$--.
    Line 51, "FFH" should read --$FF_H$--.
    Line 54, "8-bits" should read --8-bit--.
    Line 55, "OOH" should read --$00_H$--.
    Line 56, "FFH," should read --$FF_H$,--.

UNITED STATES PATENT AND TRADEMARK OFFICE
CERTIFICATE OF CORRECTION

PATENT NO. : 5,295,000
DATED : March 15, 1994
INVENTOR(S) : HIROSHI NONOSHITA ET AL.

It is certified that error appears in the above-identified patent and that said Letters Patent is hereby corrected as shown below:

COLUMN 10

Line 14, "1 bit/pixel" should read --1-bit/pixel-- and "bit map" should read --bit-map--.
Line 15, "4 bits/pixel" should read --4-bits/pixel--.
Line 36, "(1 bit/pixel, 4 bits/pixel" should read --(1-bit/pixel, 4-bits/pixel--.
Line 41, "(1 bit/pixel, 4 bits/pixel" should read --(1-bit/pixel, 4-bits/pixel--.
Line 42, ""I/O" should read --I/O--.
Line 43, "(an I/O" should read --(an "I/O--.

COLUMN 12

Line 35, "to" (first occurrence) should read --to have--.

COLUMN 13

Line 26, "selection" should read --selections--.
Line 51, "sively" should read --sively changed.--.

COLUMN 14

Line 2, "It" should read --If--.
Line 21, "request" should read --requests--.

UNITED STATES PATENT AND TRADEMARK OFFICE
CERTIFICATE OF CORRECTION

PATENT NO. : 5,295,000
DATED : March 15, 1994
INVENTOR(S) : HIROSHI NONOSHITA ET AL.    Page 4 of 4

It is certified that error appears in the above-identified patent and that said Letters Patent is hereby corrected as shown below:

<u>COLUMN 15</u>

Line 10, "mean" should read --means--.
    Line 37, "4" should read --4,--.

Signed and Sealed this

Twenty-ninth Day of November, 1994

Attest:

BRUCE LEHMAN

*Attesting Officer*    *Commissioner of Patents and Trademarks*